Figure 1:
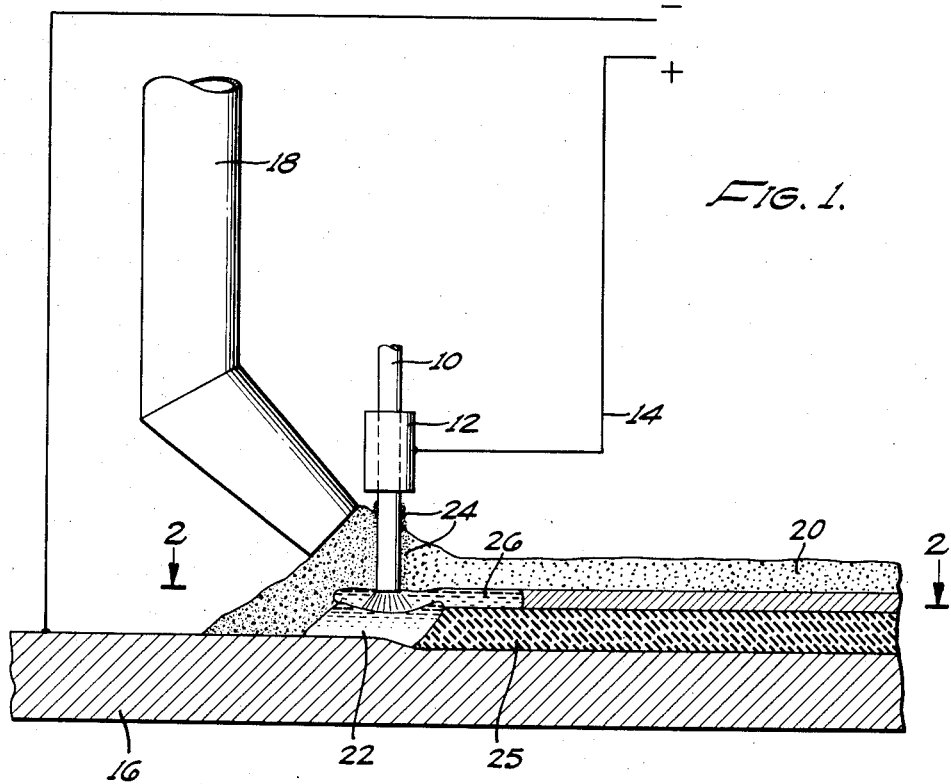

Jan. 13, 1959   H. H. TODD   2,868,949
SUBMERGED ELECTRIC ARC WELDING PROCESS
Filed April 25, 1956

HOYT H. TODD
INVENTOR.

BY *Jason Roberts*

ATTORNEY

United States Patent Office  2,868,949
Patented Jan. 13, 1959

2,868,949

SUBMERGED ELECTRIC ARC WELDING PROCESS

Hoyt H. Todd, Whittier, Calif., assignor to Western Carbide Corporation, North Hollywood, Calif., a corporation of California Application April 25, 1956, Serial No. 580,657

11 Claims. (Cl. 219—73)

This invention relates to electric arc welding procedures and refers particularly to an electric arc technique for such purposes as depositing a hardfacing alloy on a base metal.

The broad object of the invention is to provide a highly versatile electric arc process that produces an alloy deposit of superior properties and does so with outstanding economy.

The term versatility is used here in the sense of a wide choice of constituents and of the proportions of the constituents of the deposited alloy. If the alloy metal is supplied solely by the welding rod that is used in the arc process, the desired versatility can be achieved only by stocking a vast number of different welding rods. It is not practical to stock such a large variety of welding rods, however; in fact, it is not economical to stock even a moderate number of different kinds of welding rods.

Theoretically, the desired versatility may be achieved by a technique in which loose powdered metal is used in combination with conventional welding rods. Variation in the constituents of the deposited metal may be accomplished simply by varying the content of the powdered metal that is used in conjunction with the conventional welding rod. The proportions of the constituents in the deposited metal may be controlled by varying the proportions of the ingredients of the metal powder, and/or by varying the diameter of the plain welding rod that is used with the powder.

It has been found that conventional methods of using loose powdered metal with plain welding rods have serious disadvantages. One prior art method that has been tried, for example, is a submerged arc welding flux technique in which alloy metal powder is dispersed in the granulated flux material that is used to submerge the arc. The serious disadvantage of this technique, however, is that it cannot produce a metal deposit having a high alloy content. If the alloy metal is chromium, for example, the maximum chromium content that can be attained in the deposited metal is less than 10%.

There should be full freedom of choice over the range of approximately 5 to 30% of the content of chromium or other alloy metal, this being the range of acceptable degrees of Rockwell hardness for hardfacing materials, and acceptable percentages of secondary carbides. The secondary carbides from in the cooling of the deposited hardfacing metal and are necessary for wear resistance. At the upper limit of approximately 30% chromium content, the deposited hardfacing metal is relatively soft, but has the maximum content of secondary carbides; at the lower limit of approximately 5% chromium, the deposited metal is relatively hard, but has the least percentage of secondary carbides. It is apparent that any choice should be available within this range on the basis of a compromise between degree of hardness on the one hand, and percentage of secondary carbides on the other hand, the compromise being determined primarily by the use to which the hardfacing material is to be applied. There is one prior art technique employing loose metal powder with plain welding rod that does afford a choice over this whole range of 5 to 30% of alloy metal. This second prior art procedure employs a magnetically responsive metal powder in a hopper with a bottom outlet. The hopper holds a supply of the ferromagnetic powdered material which is retained in the hopper by a pair of magnets at the outlet. The welding wire is fed into the hopper and out through the bottom hopper outlet and electric current is supplied to the wire for two distinct purposes. One purpose is to set up a magnetic field to attract the magnetically responsive powdered material to the wire to form a powdered coating thereon. The second purpose is to create the required electric arc between the end of the wire and the workpiece for the deposition of molten metal on the workpiece.

One disadvantage of this second prior art technique is that the arc is visible and is exposed to the atmosphere. There is a loss of the alloy in its passage across the arc in the open air and the resulting deposit is not as homogeneous as may be obtained by a submerged arc welding procedure. A further disadvantage is that the metal is not deposited as smoothly as in a submerged arc welding technique. A further serious disadvantage is that, since the deposited metal is exposed to the atmosphere, it cools relatively rapidly, so that the secondary carbides that are formed during the cooling period are relatively small; whereas, relatively large carbide particles are required, more often than not, for the sake of wear resistance.

The basic concept of the present invention is to combine with conventional submerged arc welding flux a suitable amount of magnetically responsive clusters of metal powder having the required content of alloy metal. Each cluster includes one or more particles of non-magnetic alloy metal and at least one particle of ferromagnetic metal, the ferromagnetic metal making the cluster as a whole magnetically responsive. The granular submerged arc welding flux containing the metal powder is distributed over the work area of the base metal, in the usual manner that is characteristic of submerged arc welding procedures. When the welding rod is inserted in this layer to form the electric arc, it fuses the flux material to provide a molten protective blanket that covers both the arc and the metal deposited by the arc. The electric current flowing through the welding rod, the arc, and the workpiece forms a magnetic field which attracts the magnetically responsive clusters in the flux to the arc and to the molten metal. Thus, the concentration of the alloy metal in the flux, i. e., the ratio of the quantity of the alloy metal particles to the quantity of the fusible flux, is greatly increased at the welding zone to result in a metal deposit having a high alloy content. It is this migration of the alloy particles to the welding zone by magnetic attraction that makes it possible to produce a metal deposit having a higher alloy content than is possible by conventional submerged arc welding techniques.

The various objects, features and advantages of the invention may be understood from the following description considered with the accompanying drawing.

Figure 2:
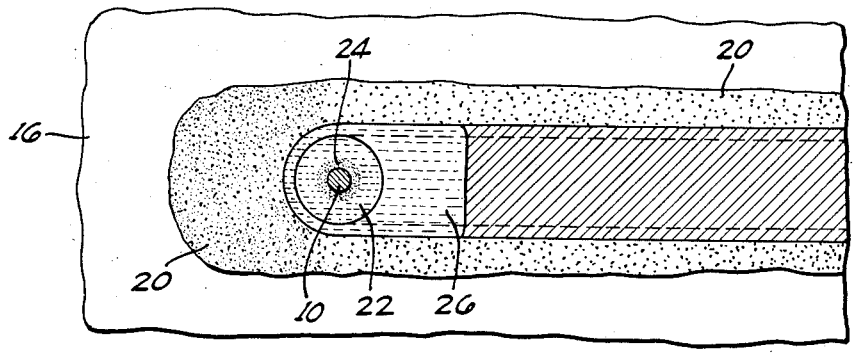

In the drawing, which is to be regarded as merely illustrative:

Fig. 1 is a schematic view, largely in section, illustrating a preferred practice of the invention; and Fig. 2 is a sectional view taken as indicated by the line 2—2 of Fig. 1.

The drawing shows, by way of example, an apparatus that may be employed to carry out the method of the invention. The welding rod 10 that serves as the electrode for forming the electric arc may be in the form of a long wire that is unwound from a spool or reel, as needed, in a well known manner. The welding rod is directed downward through a metal guide sleeve or holder 12 that is connected to a conductor 14 of the welding circuit. The other side of the welding circuit is connected to a base metal 16 on which the hardfacing metal is to be deposited by the arc.

The relative lateral movement between the welding rod 10 and the base metal 16 is to the left as viewed in Fig. 1. Positioned in advance of the welding rod 10 is means including a spout 18 to deposit a relatively thick layer 20 of alloy-enriched flux on the base metal 16. This layer 20 comprises in part a conventional granular fusible flux material for submerged arc welding, the flux material being substantially free of substances capable of evolving large amounts of gas at welding temperatures. Such a fusible flux material, for example, may comprise granular mil slag such as is produced by steel refining processes, the slag having less than .05% of phosphorus and less than .05% of sulfur.

The remaining portion of the blanket 20 consists of magnetically responsive welding powder or finely divided material comprising clusters of particles. The clusters comprise particles of nonmagnetic alloy metal with particles of ferromagnetic material bonded thereto.

Fig. 1 shows how the arc produced by the welding rod 10 forms a pool 22 of molten metal on the workpiece 16. Since the portion of the welding rod 10 below the holder 12 is a part of the welding circuit, it is surrounded by a magnetic field that attracts the magnetically responsive metal clusters and causes the clusters to form a sheath or coat 24 on the surface of the welding rod. Since the magnetized clusters magnetically repel each other, they tend to be distributed uniformly around the welding rod 10. It is apparent that the magnetically responsive metal clusters continuously migrate to the surface of the charged welding rod from the continuously deposited layer 20. Thus, the metal of the molten pool 22 comprises metal from the welding rod 10 and metal from the magnetically responsive powder that forms the sheath or coating 24. In addition, an adjacent portion of the base metal 16 melts to join the pool. The metal of the pool 22 cools to form the desired hardfacing deposit 25.

The heat produced by the arc causes a portion of the fusible flux material in the region of the arc to form a molten protective blanket 26 in which the arc is submerged. This molten blanket eventually cools to form a solid, fused layer which may be readily removed from the cooled hardfacing layer 25. It is apparent that the deposit of the fusible material of the layer 20 on the base metal 16 in advance of the arc not only results in protection from the atmosphere of the welding zone and the deposited metal, but also slows down the cooling rate of the deposited hardfacing metal forming the layer 25. An important advantage of the retarded cooling rate is that it favors the formation of relatively large secondary carbide crystals in the hardfacing layer.

The magnetically responsive metal clusters may be of various compositions in various practices of the invention. In one practice, I may employ a magnetically responsive welding power that is produced by a mixture of materials in parts by weight, as follows:

*Formula A*

363 parts of high carbon ferrochrome (70% chromium, 25% iron and 5% carbon), —30 mesh
91 parts of magnetite (Fe$_3$O$_4$), —150+250 mesh
10 parts of silica (SiO$_2$), —200 mesh
25 parts of ferrosilicon (50% silicon), —40 mesh These constituents are intimately intermixed by tumbling. Fifteen parts by weight of potassium silicate of specific gravity 1.21 is then added and the mixture is thoroughly tumbled to cause the potassium silicate to dampen all of the particles. After drying at 250° F., the material is broken up into clusters of particles in a suitable mill, and, when passed through a 40-mesh screen, the composition is ready for use.

The relatively fine magnetite and silica are dispersed among and bonded to the larger particles of ferrochrome and ferrosilicon. The ferrochrome not only provides chrome for the hardfacing weld metal, but also contributes iron and carbon to the weld metal. The silica, which may be omitted if desired, serves as a fluxing agent in the arc welding procedure, and the ferrosilicon not only serves as a deoxidizer or reducing agent, but also lowers the melting point of the weld metal, and, in addition, is an alloy metal. The potassium silicate not only serves as a binder or cementing agent, but also stabilizes the arc. In addition, the silicate is helpful for slag formation.

The ferrochrome may be replaced by any suitable alloying material including other ferroalloys, such as ferromolybdenum, ferrotungsten, ferrovanadium, or the like. The ferrochrome may also be replaced at least in part by pure metals, such as chromium, molybdenum, tungsten, vanadium, titanium and manganese, as well as ores of such metals.

Substitutes for the silica include boric acid, potassium pentaborate, aluminum oxide, fluorspar, and feldspar.

The ferrosilicon may be replaced at least in part by ferromanganese, silicon metal, calcium silicon, nickel silicon, ferroboron, and the like.

Substitutes that may be used in place of the potassium silicate include sodium silicate, ethyl orthosilicate, gum arabic, gum tragacanth, ethyl cellulose dissolved in acetone and toluene, and various other adhesive materials.

The essential ingredients, of course, are the alloy metal, the magnetite, and the binder or cementing agent, but the other ingredients are added to serve the stated purposes. The proportions may be varied, but, in general, the magnetite should comprise from 10 to 25% of the total weight of the product.

Where it is desirable to avoid excessive splatter in the welding operation, 4 parts of calcium fluoride may be added. Other alkaline fluorides may be substituted, including fluorides of potassium, sodium and lithium, as well as ammonium fluoride. Such an addition results in the release of gaseous fluoride compounds which fluxes the chromic oxide to reduce splatter. If the calcium fluoride is added, however, it is desirable also to add 4 parts of calcium carbonate or other alkaline carbonate to combine with the volatile fluorine compounds that would otherwise objectionably escape into the atmosphere.

In another practice of the invention, using the above described apparatus, I may produce the welding powder by employing a mixture of materials by weight, as follows:

*Formula B*

25 lbs. high carbon ferrochrome (7% or more carbon), —30 mesh
1 lb. 8 ozs. ferromolybdenum (60% molybdenum), —30 mesh
1 lb. 4 ozs. ferromanganese (75% manganese, 6% carbon), —30 mesh
3 lbs. 12 ozs. ferrosilicon (50% silicon), —30 mesh
3 lbs. 12 ozs. magnetite (Fe$_3$O$_4$), —150 mesh
4 ozs. calcium fluoride, —100 mesh
4 ozs. calcium carbonate, —100 mesh
1 oz. ethyl cellulose These ingredients are mixed dry, for example, by tumbling, to distribute the ethyl cellulose among the other ingredients. After this mixing operation, 600 cc. of ethyl acetate is added and the ingredients are again mixed, preferably by tumbling for ten minutes.

The solvent, ethyl acetate, combines with the ethyl cellulose to form an adhesive composition with the result that all of the particles are given a gummy coat. The mixture is then spread out for air drying to evaporate the solvent. The major portion of the resulting product is of the desired degree of fineness. It is desirable, however, to break up the final product in a suitable mill and to pass it through a 30-mesh screen.

The molybdenum increases the yield strength of the deposited metal. The manganese contributes to the hardness and abrasive character of a deposited metal, and, in addition, acts as a deoxidizing agent and a desulfurizing agent.

The ethyl cellulose is a cellulose ether made by the reaction of ethyl chloride with alkali cellulose as expressed by the type reaction:

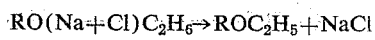

where R represents the cellulose radical.

The commercial product available under the tradename Hercules Ethyl Cellulose N-type has a substitution value between 2.42 and 2.53 ethoxyl groups per anhydroglucose unit, or 43 to 50% ethoxyl content. Preferably, the ethyl cellulose has a viscosity of 50 cps. at 5% concentration by weight at 25° C.

Instead of ethyl acetate, other solvents may be used, including butyl acetate, toluene-acetone mixtures, methanol, ethanol, ethylene dichloride, etc.

The use of an organic adhesive instead of the alkaline silica solution has several advantages. One of the more important advantages is that the use of ethyl cellulose in the manner described eliminates the necessity for the drying operation at 250° F. No heat application whatsoever is required. Another important advantage is that the final mixture of fine particles is not hygroscopic. In addition, the mixture is stable in the presence of light, heat, water, and salt solutions. The coating on the particles is exceptionally tough.

In still another practice of the invention, I may use a magnetically responsive welding powder produced by the following three formulas:

*Formula C*

363 parts of high carbon ferrochrome (70% chromium, 25% iron and 5% carbon), —30 mesh
120 parts of powdered cast iron, —100 mesh
10 parts of silica ($SiO_2$), —200 mesh
25 parts of ferrosilicon (50% silicon), —40 mesh

*Formula D*

25 lbs. high carbon ferrochrome (7% or more carbon), —30 mesh
1 lb. 8 ozs. ferromolybdenum (60% molybdenum), —30 mesh
1 lb. 4 ozs. ferromanganese (75% manganese, 6% carbon), —30 mesh
3 lbs. 12 ozs. ferrosilicon (50% silicon), —30 mesh
10 lbs. powdered cast iron, —100 mesh
4 ozs. calcium fluoride, —100 mesh
4 ozs. calcium carbonate, —100 mesh
1 oz. ethyl cellulose

*Formula E*

50 lbs. high carbon ferrochrome (70% chrome, 7% carbon), —30 mesh
50 lbs. powdered cast iron, —100 mesh
½ lb. ethyl cellulose These ingredients are mixed dry, for example, by tumbling, to distribute the ethyl cellulose and then sufficient ethyl acetate is added to dampen the mixture. Approximately 1800 cc. of the ethyl acetate may be used. The ingredients are again mixed, for example, by tumbling, and then the mixture is spaced out for air drying. When all the solvent is evaporated, the mixture may be milled to pass through a 30-mesh screen.

The relative portions of the fusible flux material and the magnetically responsive metal clusters in the blanket material supplied by the spout 18 will vary widely in various practices of the invention. In a typical procedure, for example, 40% by weight of the material supplied by the spout 18 may be fusible submerged arc welding flux, the remaining 60% comprising magnetically responsive clusters. The magnetically responsive clusters may be 70% ferrochrome and 30% cast iron powder. The welding rod 10 in this particular procedure may be ⁵⁄₆₄" in diameter. Assuming that the metal of the welding rod 10 combines in equal parts with the metal of the magnetically responsive clusters and assuming that the ferrochrome is 70% chromium, and neglecting the amount of base metal that enters the molten pool 22, the chromium content of the hardfacing deposit 25 will be 24½%. This theoretical percentage may not be attained by this particular procedure, but, in any event, the chromium content of the hardfacing deposit will range between 12 and 24½% and a relatively high or a relatively low percentage may be favored by varying various factors, as heretofore indicated.

It is apparent that an outstanding advantage of the described procedure is that it makes possible a higher alloy content in the deposited hardfacing metal than is possible by the previously mentioned conventional submerged arc welding process. This high percentage is attained by making the alloy metal in effect magnetically responsive for migration to the welding rod. A further advantage resides in the use of cast iron as a constituent of the magnetically responsive particles, since cast iron has a high carbon content and serves conveniently as means for introducing carbon into the metal of the hardfacing deposit.

My description of specific practices of the invention will suggest various changes, substitutions and other departures that lie within the spirit and scope of the appended claims.

I claim as my invention:

1. A method of applying to a base metal a metal layer of a composition having a magnetic content and a nonmagnetic alloy metal content, characterized by the steps of: placing at least a part of the length of a welding rod in an electric circuit for deposition of the metal of the rod on the base metal by an electric arc, said welding rod comprising a portion of the content of said composition, less than all of the magnetic content and less than all of the nonmagnetic alloy content; finely dividing the remaining nonmagnetic alloy content to form particles; finely dividing the remaining magnetic content to form particles; bonding the nonmagnetic alloy particles and the magnetic particles together to form magnetically responsive clusters of particles; mixing said magnetically responsive clusters of particles with granulated fusible flux material substantially free of substances capable of evolving large amounts of gas at welding temperatures; depositing a layer of the mixture of clusters and fusible flux material on the base metal; creating an arc between the welding rod and the base metal inside said layer to cause the clusters in the layer to be magnetically attracted to the welding rod to form a coating thereon, to cause the metal of the clusters together with the metal of the welding rod to form a molten metal pool at the arc on the base metal, to cause the fusible flux content of the layer to form a molten blanket protecting the arc and the molten metal from the atmosphere; and feeding said welding rod with adhering clusters thereon to the arc while causing relative movement between the welding rod and the base metal with the molten blanket retarding the cooling rate of the deposited metal.

2. A metal-enriched flux mixture for submerged electric arc welding comprising: granulated fusible mineral flux substantially free of substances capable of evolving large amounts of gas at welding temperatures; and magnetically responsive clusters, said clusters including particles of alloy metal of low magnetic permeability and finely divided particles of ferromagnetic material bonded thereto.

3. A flux mixture was set forth in claim 2, in which said clusters include finely divided alkaline fluoride.

4. A flux mixture as set forth in claim 3, which includes finely divided alkaline carbonate.

5. A flux mixture as set forth in claim 2, in which a nonhygroscopic organic adhesive bonds the ferromagnetic particles to the particles of alloy metal in said clusters.

6. A flux mixture as set forth in claim 5, in which said organic adhesive is ethyl cellulose.

7. A flux mixture as set forth in claim 2, in which the ferromagnetic particles of said clusters are bonded to the particles of alloy metal by a silicate.

8. A flux mixture as set forth in claim 2, in which the ferromagnetic material is magnetite and amounts to 10 to 25% of the content of the clusters by weight.

9. A flux mixture as set forth in claim 2, in which the ferromagnetic particles in said clusters are iron particles.

10. A flux mixture as set forth in claim 9, in which said iron particles are particles of cast iron.

11. A metal-enriched flux mixture for submerged electric arc welding comprising: granulated fusible mineral flux substantially free of substances capable of evolving large amounts of gas at welding temperatures; finely divided ferrochrome particles; finely divided silica particles; finely divided ferrosilicon particles; and finely divided ferromagnetic particles, said particles of the four materials being bonded together to form finely divided magnetically responsive clusters of particles.

References Cited in the file of this patent

UNITED STATES PATENTS

| | | |
|---|---|---|
| 2,326,865 | Kennedy | Aug. 17, 1943 |
| 2,767,302 | Brashear | Oct. 16, 1956 |
| 2,810,063 | Brashear | Oct. 15, 1957 |

FOREIGN PATENTS

| | | |
|---|---|---|
| 608,270 | Great Britain | Sept. 13, 1948 |

OTHER REFERENCES

"Industry and Welding Monthly," February 1954, pp. 66–68.

"Welding Engineer," November 1954, pp. 52–53.